(12) United States Patent
Sonnenberg

(10) Patent No.: US 9,222,811 B2
(45) Date of Patent: Dec. 29, 2015

(54) FLOWMETER

(71) Applicant: HYDROMETER GMBH, Ansbach (DE)

(72) Inventor: Hans-Michael Sonnenberg, Ansbach (DE)

(73) Assignee: DIEHL METERMING GMBH, Ansbach (DE)

(*) Notice: Subject to any disclaimer, the term of this patent is extended or adjusted under 35 U.S.C. 154(b) by 46 days.

(21) Appl. No.: 14/291,246

(22) Filed: May 30, 2014

(65) Prior Publication Data
US 2014/0352453 A1 Dec. 4, 2014

(30) Foreign Application Priority Data
Jun. 4, 2013 (DE) .......... 10 2013 009 347

(51) Int. Cl.
G01F 1/00 (2006.01)
G01F 1/05 (2006.01)
G01F 1/66 (2006.01)
G01F 1/68 (2006.01)
G01F 15/18 (2006.01)

(52) U.S. Cl.
CPC .. *G01F 1/05* (2013.01); *G01F 1/66* (2013.01); *G01F 1/662* (2013.01); *G01F 1/68* (2013.01); *G01F 15/185* (2013.01)

(58) Field of Classification Search
CPC ................ G01F 1/05; G01F 1/68; G01F 1/66
USPC .................. 73/861, 204.11, 861.18
See application file for complete search history.

(56) References Cited

U.S. PATENT DOCUMENTS

| 3,027,764 | A | 4/1962 | Arragon |
| 5,116,119 | A | 5/1992 | Brayer |
| 5,750,892 | A | 5/1998 | Huang et al. |
| 2002/0033193 | A1 | 3/2002 | McNeely et al. |
| 2006/0201259 | A1 | 9/2006 | Umekage et al. |
| 2011/0016967 | A1 | 1/2011 | Tonomura et al. |
| 2011/0061469 | A1 | 3/2011 | Maahs |
| 2013/0160571 | A1* | 6/2013 | Williamson ......... G01N 1/2247 73/863.41 |

FOREIGN PATENT DOCUMENTS

| DE | 103 27 934 B3 | 2/2005 |
| DE | 112010003671 T5 | 3/2013 |
| EP | 0536080 A2 | 4/1993 |

(Continued)

*Primary Examiner* — Jewel V Thompson
(74) *Attorney, Agent, or Firm* — Scully, Scott, Murphy & Presser P.C.

(57) ABSTRACT

Flowmeter for a fluid, comprising a duct unit which forms the ducts of the flowmeter, the duct unit having a plurality of ducts in a measurement region, and at least one measuring device being arranged in one of these ducts, the duct unit comprising a dividing device with one or more dividing stages for apportioning the fluid flowing into the flowmeter to the ducts, the or each dividing stage comprising at least one damming element which apportions fluid flowing through an inflow duct to at least two subducts, characterized in that the dividing device and/or an accelerating device, which is arranged in at least one of the ducts between the dividing device and measurement region, are/is designed to accelerate the fluid in such a way that the fluid has a first flow velocity upstream of the dividing device and in the measurement region a second flow velocity which is at least 1.5 times as high, in particular at least twice as high.

35 Claims, 4 Drawing Sheets

(56) References Cited

FOREIGN PATENT DOCUMENTS

| | | | |
|---|---|---|---|
| JP | 2004-233247 A | 8/2004 | |
| WO | WO 01 75402 A1 | 10/2001 | |
| WO | WO 2004092687 A1 | 10/2004 | |
| WO | WO 2005005932 A1 | 1/2005 | |

* cited by examiner

FLOWMETER

BACKGROUND OF THE INVENTION

The invention relates to a flowmeter for a fluid, comprising a duct unit which forms the ducts of the flowmeter, the duct unit having a plurality of ducts in a measurement region, and at least one measuring device being arranged at least in one of these ducts, the duct unit comprising a dividing device with one or more dividing stages for apportioning the fluid flowing into the flowmeter to the ducts, the or each dividing stage comprising at least one damming element which apportions fluid flowing through an inflow duct to at least two ducts.

DISCUSSION OF THE PRIOR ART

In flow measurements for fluid flows, it is often advantageous to carry out the measurements only on a substream which is separated from the main stream. For some measurement principles, for example in the thermal measurement principle or in ultrasonic measurements, only measurements on the substream are even possible when higher throughflow rates are to be detected. By measurements being carried out on subflows, flowmeters can also have a more flexible throughflow rate.

The most important feature for substream measurement is the apportionment function between the substream and main stream. In order to obtain reliable measurement values, it is necessary that the apportionment function is known. In known measurement systems for measuring a substream, such as are described, for example, in WO 2004/092687, to determine the apportionment function it is necessary that specific variables, such as the temperature, the flow properties of the medium and the pressure, are known. If these properties vary during measurement, this leads to falsification of the measurement.

In spite of efforts to bring about uniform apportionment, dependence upon the temperature, flow and viscosity of the medium is high, and therefore meters of this type require complicated calibration and can be operated only with predefined media. However, where some substances are concerned, the physical properties of the medium vary sharply with the composition of the medium. For example, natural gases of the L group cannot be measured reliably by means of meters of this type.

In publication JP 2004-233247, it is proposed to carry out the division of the gas stream in such a way that the main stream is divided by a separation element into two substreams which are then divided into two further substreams in each case by further separation elements. Dividing the main flow this way improves the uniformity of apportionment of the flow and minimizes the problem of the dependence of flow apportionment upon the operating parameters. Nevertheless, even insignificant deviations, particularly in the case of a disturbed inlet profile, in the way in which a flow is divided, in the routing of the medium in the subducts and in the composition may lead to greatly different flow apportionments.

SUMMARY OF THE INVENTION

The object of the present invention, therefore, is to specify a flowmeter which is improved particularly with regard to the independence of the apportionment function from the operating parameters.

The object is achieved by means of a flowmeter of the type mentioned in the introduction, a dividing device and/or an accelerating device, which is arranged in at least one of the ducts between the dividing device and measurement region, being designed to accelerate the fluid in such a way that the fluid has a first flow velocity upstream of the dividing device and in the measurement region a second flow velocity which is at least 1.5 times as high, in particular is at least twice as high.

The invention is based on the idea that it is advantageous to carry out throughflow measurement at higher velocity, although, as a rule, the flow should be laminar during measurement, and to carry out the division of the fluid flow into a plurality of subflows at velocities which are as low as possible. Low velocities during flow division are advantageous, in particular, since an especially low Reynolds' number and therefore a flow with especially little turbulence are consequently achieved during flow division. Moreover, at low flow velocities, a uniform flow profile is also formed. Furthermore, in the case of closed ducts, low flow velocities are also to be equated with large cross-sectional areas of the ducts and high flow velocities with small cross-sectional areas of the ducts. The result of this, in particular, is that, in the case of division with a low flow velocity and measurement with a high flow velocity, the flow resistance of the measurement region is relatively high and the flow resistance in the region of division is relatively low. The result of this is that different flow resistances of the subducts in the region of flow division have an appreciably lower effect upon the apportionment of the fluid to the ducts. Profile disturbances of the main flow in the inlet region are also damped as a result of this type of configuration of a flowmeter, so that the measurement errors which have arisen from a profile disturbance can be reduced.

A further refinement of the invention is to ensure a sufficiently laminar flow in the measurement region. As a result of this, the differences in the flow velocity between the measurement region and the region upstream of the dividing device can also be made markedly greater, without the apportionment function becoming dependent upon the operating parameters of the fluid. For example, the second flow velocity may be at least three times or at least four times as high as the first flow velocity.

Although the influence of the dividing device upon the division of the overall flow into subflows decreases because of the lower flow velocity in the region of flow division, a substantially identical inflow geometry of the subducts is nevertheless ensured, in order to achieve as uniform a division of the overall flow as possible.

By means of the flowmeter according to the invention, it is possible to measure various fluids, that is to say gases, such as, for example, natural gas, and liquids, such as, for example, water.

The flowmeter according to the invention is subdivided into a plurality of subregions. Assuming an incoming flow, it is also possible to introduce this into a fluid reservoir which is arranged upstream of the dividing device in the flow direction. The arrangement of a reservoir upstream of the flowmeter possesses two appreciable advantages. Particularly in the case of elastic fluids, such as, for example, gases, a reservoir mounted upstream of the flowmeter acts as an element which smoothes out rapid changes in the fluid throughflow. Sudden pressure changes at the inlet of the flowmeter then lead first to a pressure change in the reservoir. However, since the reservoir has a relatively large volume, at least pulse-like pressure changes are transferred, only attenuated, to the flowmeter. In the case of a flowmeter, particularly for the detection of consumption rates, it is usually desirable that the throughflow rates are detected in a timescale of minutes, hours or even days. It is not necessary, here, to break down sudden changes in throughflow accurately, as long as the overall throughflow rate is correctly detected. However, such sudden changes in throughflow in very short timescales may disrupt some measurement methods. It is therefore advantageous to smooth out the throughflow rate by means of a preceding reservoir. A further advantage is afforded in that the reservoir can completely eliminate inflow disturbances, so that a homogeneous inflow profile can be formed before inflow into the first dividing device. Moreover, a reservoir forms a relatively large volume with a low pressure gradient. In the reservoir itself, therefore, the fluid flows very slowly. As a result, flow measurement is independent of the shape of the flow profile flowing into the flowmeter and turbulences are reduced. Since the fluidic convergence of a divided flow likewise entails a tendency to the formation of turbulence, the same positive effects can be achieved by means of a following reservoir as at the inflow.

A dividing device is arranged upstream of the measurement region. The dividing device serves for dividing a main flow into at least two, preferably a plurality of, subflows. As explained above, the flow velocity of the fluid should be relatively low in this region. At least the inflow ducts of the first dividing stage should therefore have a relatively large cross-sectional area. In particular, as uniform a division of the flow as possible can take place in the or each of the dividing stages of the dividing device. This is possible in many different ways which will be dealt with in more detail later.

Downstream of the dividing device, the main flow is divided into a plurality of subflows and is consequently apportioned to a plurality of ducts. The ducts have, in particular, the same flow resistance and the division of the flow is, in particular, uniform. It is possible that acceleration of the fluid has already taken place within the framework of the division of the main flow into the subflows. In particular, in one or more of the dividing stages, the subducts may have a smaller cross-sectional area than the respective inflow duct, with the result that acceleration of the fluid is achieved. If the velocity of the fluid downstream of the dividing device is already at least 1.5 times or twice as high as the velocity of the fluid upstream of the dividing device, the measuring device may be arranged on one of the ducts downstream of the dividing device.

In many embodiments, however, acceleration or further acceleration of the fluid upstream of the measurement region is desirable. Consequently, alternatively or additionally to the acceleration of the fluid in the dividing device, acceleration of the fluid may take place in an accelerating device which is arranged downstream of the dividing device in the flow direction.

As mentioned in the introduction, for uniform division of the main flows into subflows it is advantageous if all the ducts which guide the subflows have an identical flow resistance. It is therefore advantageous if not only the measuring duct which comprises the measuring device, but also the further ducts have an accelerating device of this type. These accelerating devices are, in particular, of identical construction. To implement the accelerating device, a plurality of possibilities which are described below are provided.

Downstream of the accelerating device or downstream of the dividing device if no accelerating device is provided, is arranged the measurement region in which measurement of the throughflow takes place in at least one measuring duct. Since the flow in the flowmeter according to the invention is distributed preferably uniformly to a multiplicity of ducts, that fraction of the flow which flows through the measuring duct is independent of further operating parameters, such as the fluid composition, temperature or the like. Consequently, in the flowmeter according to the invention, an overall throughflow can be reliably deduced over a wide parameter range, without complicated calibration, from the throughflow measured in the measuring duct. In order to have identical flow resistances in the arrangement, it is advantageous if the duct routing in the measurement region is configured such that it allows for the sensor-specific features of the measuring unit. Thus, for example for a microthermic sensor arrangement, it is advantageous to implement a duct height at the sensor of 0.5 to 1.5 mm. In the case of an ultrasonic measuring device, it is necessary, for example, to feed the sound into the measurement section by means of a reflector. The flow deflection resulting from this can then be simulated in all the subducts in order to obtain identical flow resistances.

Mostly, downstream of the measurement region, the ducts should be converged again into one common duct. This takes place in a convergence device which converges the fluid flowing through the measurement region into an outlet duct of the flowmeter. It must be remembered, here, that the type of convergence, of course, has an influence upon the flow resistances of the ducts and therefore also upon the division of the main flow into subflows in the dividing device. It is necessary here, for as uniform a division as possible of the main flow into subflows, to ensure in the convergence device a convergence which generates as identical flow resistances as possible in all the ducts, independently of the operating parameters. The set-up of such a convergence device is explained in the later text.

Various possibilities for the set-up of the dividing device are dealt with first below. In the simplest case, the dividing device may consist of a single dividing stage, to which a flow flowing in through the inflow duct is apportioned into at least two subducts. To achieve a uniform flow division independent of the operating parameters, it is advantageous if the subducts of each dividing stage have essentially identical flow resistances and, in particular, also identical duct geometries.

The flow resistance of the individual subducts depends, on the one hand, on the type of division and, on the other hand, on the further course of the duct. It is possible especially simply to achieve essentially identical flow resistance of the subducts when the subducts are led essentially identically along their further course. Thus, the further division of the subducts, the optional additional acceleration of the fluid in an accelerating device and the subsequent convergence of the fluid should take place as identically as possible for each of the subducts.

Alternatively, however, the identical flow resistances of the subducts may also be achieved by the deliberate interruption into individual subducts of additional elements which increase the flow resistance, in order thereby to balance the flow resistances of the different subducts. However, if the subducts have a greatly different further routing, such balancing may present problems, since the influence of the additional damming elements may depend upon the operating parameters.

As a further alternative, it is also possible to increase the flow resistances of the subducts greatly by means of additional damming elements or very narrow ducts. In this case, the influence of the other flow resistances upon the apportionment of the main stream into the subducts is reduced.

In order to achieve as uniform a division of the flow as possible, it is advantageous if the inflow geometry of the subducts is essentially identical. This is possible especially simply when the dividing stage or at least one of the dividing stages has exactly two subducts. Thus, in a rectangular, a round or any other duct, the cross section of which has a mirror plane, a damming element symmetrical with respect to this mirror plane may be arranged in order to apportion the flow into subducts on this mirror plane. If the inflow duct is sufficiently long, it can be assumed that the geometry of the flow profile corresponds essentially to that of the inflow duct. If, therefore, the inflow duct is divided along one of its planes of symmetry, the flow is also divided along one of its planes of symmetry and therefore uniformly.

In order to ensure that the inflow geometry into the subducts is as identical as possible, it may also be advantageous as far as possible to decouple the inflow regions of the subducts. When the fluid impinges onto one or more damming elements, between which the ducts are formed, the flow velocity in the transitional region between the subducts and the inflow duct is locally very different. The damming elements sharply brake the fluid flow impinging upon them, but the flow velocity of the fluid is increased in the region of the ducts. This non-uniform flow profile may lead to an interaction of the fluid flows which flow into the various ducts and may consequently generate turbulences, local pressure differences or the like, and this may lead, in turn, to a non-uniform apportionment of the fluid stream into the subducts. It is therefore advantageous if, in the dividing stage or in at least one of the dividing stages, at least two of the subducts are spaced apart by the damming element, the spacing of the subducts being at least three times as large as the diameter of one of the subducts.

It is also often desirable to divide an inflow duct in such a way that the division does not correspond to any natural symmetry of the inflow duct. In this case, the subducts are at different distances from the walls of the inflow duct. However, this results in a different inflow geometry of the subducts, which is to be avoided in order to achieve a uniform apportionment of the fluid flows to the subducts. In order to reduce the influence of the wall of the inflow duct upon the fluid division, the inflow regions of the subducts should be spaced apart from the walls of the inflow duct.

A subdivision of rectangular inflow ducts into at least three ducts may therefore also take place, in the dividing stage or in at least one of the dividing stages, the inflow duct being essentially rectangular and its width being at least three times as large as its height, the damming element subdividing the inflow duct in the width direction into at least two, in particular at least three, subducts, the subducts being spaced apart from the margin of the inflow duct in the width direction by at least 10%, in particular at least 15%, of the width of the inflow duct. In this case, an especially uniform division is possible when the width of the inflow duct is at least five times, in particular at least ten times, as wide as the height.

Particularly in order to reduce the dimensions of the dividing stages and therefore also of the flowmeter, it may be advantageous to carry out the division of the inflow duct into several ducts in such a way that the subducts are distributed over the entire cross-sectional area of the inflow duct. Thus, in the dividing stage or in at least one of the dividing stages, the damming element can subdivide the inflow duct into at least three subducts, the subducts lying in at least two planes. A two-dimensional division of the inflow duct thus takes place.

In this case, in particular, it is possible that, in the sectional plane, the dividing stage consists in the region of the damming element, perpendicular to the direction of the inflow duct, of at least three identical regions which each have at least one subduct. The regions may in this case be rotated with respect to one another, as desired, and be spaced apart from one another. The identical set-up of the regions ensures that the inflow geometry of each subduct of the dividing stage is identical. A multiplicity of embodiments may be envisaged within this set-up arrangement for dividing stages.

Thus, the cross section of the inflow duct may be circular and the dividing stage may comprise at least three subducts spaced apart uniformly in the circumferential direction of the inflow duct. In this case, the geometry of the elements surrounding a subduct is identical for each of the subducts. Thus, each of the subducts has in its immediate vicinity a radially spaced-apart outer wall of the inflow duct and two adjacent ducts spaced apart at a certain angle, and the relative arrangement of the further ducts is also identical for each of the subducts.

Alternatively, it is possible that the cross section of the inflow duct is rectangular and the dividing stage comprises exactly four subducts. In this case, the subducts may be arranged in the four quadrants of the rectangular inflow duct in such a way that the subducts have the same height and width and are arranged at an identical distance from the nearest walls in each case. An identical inflow geometry is consequently achieved for the four subducts.

As mentioned in the introduction, it is possible that acceleration of the fluid takes place as early as in the dividing device. Such acceleration is possible, in particular, in that, in the dividing stage or in at least one of the dividing stages, the sum of the cross-sectional areas of the subducts is smaller than the cross-sectional area of the inflow duct.

As explained, the dividing device may be formed in many different ways and apportions the fluid flow preferably uniformly to a plurality of ducts. Acceleration or further acceleration of the fluid may take place in these ducts. For this purpose, the flowmeter according to the invention may have an accelerating device, advantageous versions of which are explained below.

The acceleration of the fluid in a duct corresponds at the same time to a reduction in the cross-sectional area of the duct, since the overall throughflow rate must be identical in each duct section of a duct. In the flowmeter according to the invention, acceleration takes place, in particular, in rectangular gap ducts. Gap ducts are advantageous, since a laminar flow can be achieved in them especially easily. It is therefore assumed below that a fluid stream is to be accelerated in a rectangular duct in the accelerating device. The principles described can also be transferred to non-rectangular ducts, but in these cases additional measures sometimes have to be taken in order to avoid turbulences.

The cross-sectional area of at least one of the ducts may therefore be smaller downstream of the accelerating device than upstream of the accelerating device, the duct having in the region of the accelerating device an essentially rectangular shape with two side walls, with a bottom and with a top.

In the flowmeter according to the invention, it is advantageous for all the ducts to be formed within one common structural unit. The ducts are routed here, for example, in parallel and so as to be spaced apart by walls. The simplest way of reducing the cross-sectional area of the ducts would in this case be to increase the wall thickness. However, depending on the method for producing the flowmeter, such an increase in the wall thickness may not be possible with the required accuracy.

However, acceleration may also take place in that the accelerating device is an angled region, in which the direction of the duct changes into the direction of one of the side walls, in particular the two side walls having the same shape in the angled region. If a multiplicity of such walls which space the ducts apart are arranged so as to be offset in parallel in a direction perpendicular to the original duct direction, the bend or the change in direction of the duct is located at the same point for all the ducts, as seen in the duct direction. In other words, the two side walls of the duct have the same curvature at the points which lie opposite one another perpendicularly to the duct direction. If, in an arrangement of this type, the walls are angled at an angle α, the width of the duct in the angled region is the product of the width of the duct in the region upstream of the angled region and the cosine of α.

Alternatively or additionally, the width of the ducts may also be reduced in that at least one of the side walls of the duct also forms a side wall of a second duct upstream of the accelerating device, and downstream of the accelerating device the duct and the second duct are spaced apart in the direction of the side wall by an interspace. In this case, it is possible to converge the two walls again before the convergence of the ducts, for example in order to achieve convergence of the ducts at a lower flow velocity. The side walls of the ducts may also end freely in a further duct. In this case, the convergence and the slowing of the fluid take place together.

Particularly when the walls which delimited the interspace end freely in a further duct, the bottom and/or the top may also continue in the region of the interspace and may have in the region of the interspace an orifice for the introduction of, in particular, purified fluid. Additional fluid scavenging of the interspace is consequently achieved. If such scavenging does not take place, gas exchange between the interspace and the other regions of the flowmeter may take place only very slowly. If, for example, the fluidic type to be metered changes, the fluid which is located in the interspace may diffuse into the region of the measuring device and falsify measurement. This is avoided by scavenging the interspace.

After acceleration, measurement of the fluid throughflow may take place. To measure the throughflow in a duct, a multiplicity of methods, for example the thermal measuring method and also sonic measurements, are known in the prior art. The carrying out of throughflow measurement itself will therefore not be dealt with in any more detail.

After measurement, the fluid flows of the various ducts should mostly be converged again into one common duct. This takes place in the convergence device described in more detail below.

It is possible that the duct unit comprises a convergence device with one or more convergence stages for converging the fluid flowing through the ducts of the measurement region into one outlet duct, each convergence stage converging fluid flowing through at least two individual ducts into one collecting duct.

As explained in the introduction, the type of convergence of the ducts may have an appreciable influence upon the flow resistance of the ducts and therefore upon the apportionment of the fluid stream to the ducts. Differences in the outflow geometry of the individual ducts and random adhesion effects on walls should therefore be avoided. In order to reduce the influence of the convergence device upon the flow resistance of the ducts, it is also possible to arrange between the measurement region and the convergence device a slowing device which lowers the flow velocity of the fluid. Such a slowing device may, in principle, be constructed in the same way as a reverse accelerating device. The embodiments described for accelerating devices may therefore be adapted, in which case the region of the inflowing fluid and the region of the outflowing fluid are to be interchanged. In the case of the slowing device, it must be remembered that the widening of the duct cross section leads, as a rule, to stall zones which may have an adverse effect on the convergence of the flows.

Moreover, to balance the outflow geometry of the outlet ducts, the explanations relating to the dividing device may be adopted. Thus, what was said with regard to the inflow geometry in relation to the dividing device will be transferred to the convergence device with regard to the outflow geometry.

Furthermore, it is advantageous if, in the convergence stage or in one of the convergence stages, the individual ducts end in a collecting duct with a larger diameter, at least one of the individual ducts having at its end a lengthening element which forms a lengthening of a side wall of the individual duct in part of the circumference of the individual duct. When a fluid flows out of one of the individual ducts into the collecting duct, random wall adhesion effects may arise. Depending on insignificant flow variations, the fluid flow, when it flows out, may adhere to one of the walls of the duct and consequently vary the flow resistance of the duct. In order to avoid this, part of the side wall of the individual duct may be deliberately lengthened, with the result that a controlled wall adhesion of the fluid flow and therefore a controlled flow resistance are achieved.

A further potential influence upon the flow resistance of the ducts is the interaction between fluid flows flowing out of the individual ducts in the collecting duct. Thus, slightly different inlet flows may sometimes lead to a greatly different pressure distribution in the outflow region of the individual ducts, as a result of which the flow resistances of individual ducts may vary greatly. In order to avoid this, it is advantageous if the convergence device has at least one swirling element for swirling the fluid flow. In this case, the outlet flow is turbulent. As a result, semi-stable pressure distributions which influence the flow resistance of one or more ducts are prevented or at least reduced.

The swirling elements may be essentially flat on the side facing the fluid flow. A side movement of the fluid is thereby imparted and therefore especially high turbulence is achieved.

In order to ensure that no adhesion, stalling or interactive effects occur for the outlet flows, it is advantageous if the inlet ducts of the convergence stage or of at least one of the convergence stages have at least one, in particular two swirling elements in the transitional region to the collecting duct. If the use of the swirling elements is combined with a fluid reservoir in or downstream of the collecting duct, the turbulences resulting from duct widening and convergence can run out so as then to be fed to an outflow duct. The decoupling of turbulences with respect to the measurement region can thereby be further improved. In particular, dynamic flow processes can be damped more effectively.

As described in the introduction, it is advantageous if the duct unit comprises at least one fluid reservoir which is arranged upstream of the dividing device and/or downstream of at least one of the convergence stages. By means of the fluid reservoir, fluctuations in the flow velocity upstream of the flowmeter can be smoothed out and turbulences can be reduced.

In order to reduce turbulences which may occur whenever there is a change in duct geometry, it is advantageous if the length of at least one of the ducts is at least three times, in particular at least five times, as large as the cross section of the duct.

Depending on the measurement method used, different duct shapes of the measuring duct are advantageous. Thus, for example, it is possible that the cross-sectional area of at least one of the ducts is rectangular or round.

Rectangular ducts may advantageously be designed as gap ducts. It is possible that the height:width ratio of at least one of the rectangular ducts is at most 1:3, in particular at most 1:5, especially at most 1:10. Gap ducts usually result in a uniform laminar flow which is advantageous for dividing the flow and for measurements. Especially advantageously, at least one of the ducts is between 0.7 mm and 1.5 mm high. Gap ducts should usually be designed to be as flat as possible in order to achieve an optimal laminar flow. If, however, ducts are formed too flat, even minimal manufacturing tolerances of the ducts lead to the formation of turbulences and to changes in the flow resistance of the duct.

Additional damming elements for increasing the flow resistance may also be arranged at least in one of the ducts. This can be utilized, on the one hand, to equate the flow resistances of various ducts to one another, and, on the other hand, the flow resistance of all the ducts can also be increased. This is advantageous, since an overall higher flow resistance of the ducts reduces the contribution made by the division and convergence of the ducts to the flow resistance, and thereby differences between the ducts in the case of the division or the convergence of the fluid have less influence upon measurement.

The measuring device in the measurement region may consist, in particular, of a sensor or of a sensor arrangement which detects a fluid variable, in particular the throughflow rate. In particular, the sensor arrangement may comprise a thermal, in particular microthermal sensor or the sensor may be a thermal, in particular microthermal sensor. The sensor device may also comprise an ultrasonic sensor, in particular an ultrasonic sensor unit operating according to the differential transit-time method, or the sensor may be an ultrasonic sensor, in particular an ultrasonic sensor unit operating according to the differential transit-time method.

In addition, the present invention relates to a flowmeter arrangement which comprises at least one flowmeter of the type described above and at least one flowmeter dummy which is constructed identically to the flowmeter, except that there is no measuring device arranged in the measuring duct, an additional dividing device being designed for the uniform distribution of a fluid stream to the flowmeter and to the flowmeter dummy, and an additional convergence device being designed for converging the fluid streams of the flowmeter and of the flowmeter dummy.

Measurements on substreams generally improve the scalability of measurement methods for throughflow measurements. It is nevertheless highly complicated to develop separate flowmeters for each throughflow rate range. An alternative to this is to operate a plurality of flowmeters in parallel and in each case to route only one substream of the stream to be measured through each flowmeter. This often entails additional costs, since multiple complicated measuring devices and evaluation electronics have to be present. It is therefore advantageous to use one or more flowmeter dummies in addition to the flowmeter. Since these are constructed identically to the flowmeter, with the exception of the absence of the measuring device, they also have an identical flow resistance. Measurement of higher flow rates can therefore be achieved at an essentially reduced financial outlay.

In order to use flowmeter dummies, it is necessary to distribute a fluid stream to the flowmeter and to one or more flowmeter dummies and to converge it again after measurement. For this purpose, an additional dividing device and an additional convergence device are used. The above-explained embodiments of the dividing device and of the convergence device can be employed for these devices. Moreover, division and convergence can be carried out at a lower flow velocity and the fluid can be fed to the flowmeter at a higher flow velocity.

BRIEF DESCRIPTION OF THE DRAWINGS

The further advantages and details of the invention will be gathered from the following exemplary embodiments and the accompanying drawings in which.

DETAILED DESCRIPTION OF THE INVENTION

Figure 1:
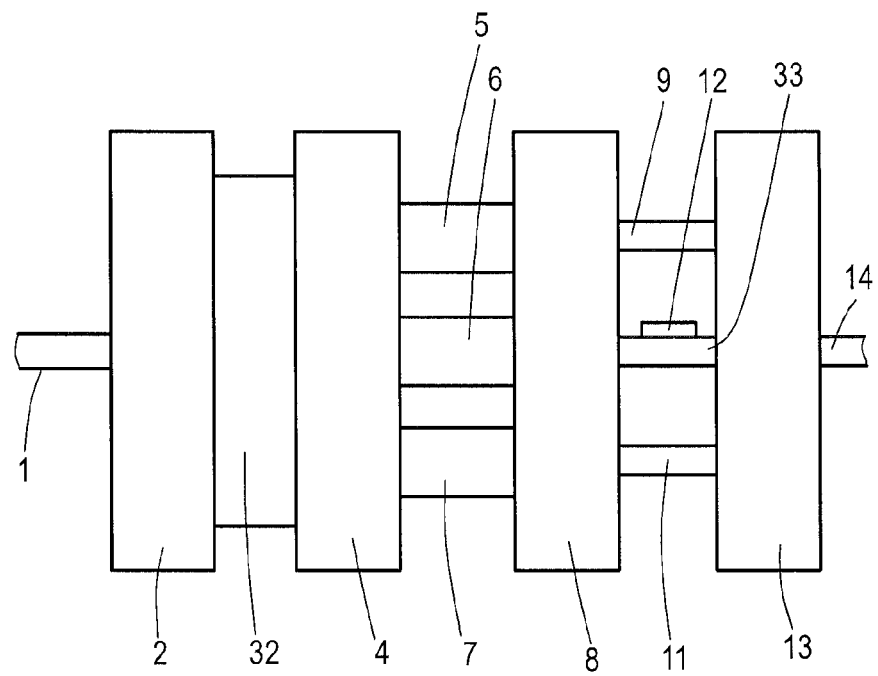
FIG. 1 shows a diagrammatic illustration of the flowmeter according to the invention.

FIG. 1 shows a diagrammatic illustration of a flowmeter. The fluid is fed to the flowmeter via a feed duct 1 and leaves the flowmeter through the outlet duct 14. Bypass measurement is carried out on the flowmeter by means of the measuring device 12 on the measuring duct 33. So that reliable evidence as to the overall throughflow may be obtained with the aid of this bypass measurement, independently of further parameters, such as temperature or fluid composition, it is especially advantageous if the fluid stream is distributed uniformly to the ducts 9, 11, 33 in the measurement region.

In order to achieve this, it is advantageous in the first place to decouple the flowmeter from the flow profile in the feed duct 1 and to smooth out sudden pressure fluctuations in the feed duct 1. The feed duct 1 is therefore first routed into a fluid reservoir 2. The fluid reservoir 2 consists of a volume which is sufficiently large to allow a stipulated dwell time of the fluid in the reservoir. For example, the volume of the fluid reservoir 2 may be so large that the maximum throughflow to be measured in one second can be accommodated integrally in the fluid reservoir 2.

It is advantageous if the inflow and the outflow of the fluid reservoir 2 do not lie directly opposite one another, since in this case a large part of the fluid would pass through the fluid reservoir 2 directly. An optimal dwell time of the fluid in the fluid reservoir 2 may be achieved, for example, by turbulence at the transition of the feed duct 1 into the fluid reservoir or by arranging the inflow and the outflow in such a way that a rectilinear fluid stream through the fluid reservoir 2 is not possible. Since the flow velocity in the fluid reservoir 2 is lowered virtually to zero, the flow in the inlet duct 32 is virtually independent of the flow profile in the feed duct 1, in particular independent of turbulences arising there. It should be noted that the inlet duct 32 is not absolutely necessary, since, for example, damming elements of the dividing device 4 may be introduced directly into the fluid reservoir 2, with the result that the inflow duct of the first dividing stage of the dividing device 4 is formed by the fluid reservoir 2 itself.

The inlet duct 32 or, as explained above, the fluid reservoir 2 forms the inflow duct of the dividing stage or of the first dividing stage of the dividing device 4. In the exemplary embodiment, the fluid stream of the inlet duct 32 is to be apportioned to three ducts 5, 6, 7. For dividing into three subducts, it would be advantageous to use a single dividing stage which has three dividing ducts. Advantageous embodiments of dividing stages with more than two dividing ducts are described later with reference to FIG. 2 to FIG. 4.

For easier understanding, FIG. 1 shows diagrammatically a dividing device, the inflow duct of which has the same cross-sectional area as the sum of the cross-sectional areas of the three ducts 5, 6 and 7. Since a higher fluid velocity is desired for measurement than for division, the fluid flow shall subsequently be accelerated in the accelerating device 8. The accelerating device 8 is illustrated here solely by a reduction in the duct cross section between the ducts 5, 6 and 7 and the ducts 9, 11 and 33. Exemplary embodiments of the accelerating device are described with reference to FIG. 5 and FIG. 6.

After acceleration, measurement can take place in the duct 33 by means of the measuring device 12. The fluid flows in the ducts 9 and 11 are accelerated only in order to ensure that the ducts 9, 11 and 33 have the same flow resistance and therefore a uniform division of fluid takes place independently of further operating parameters. As a rule, the fluid, the throughflow of which has been measured, is to be used further. After measurement, therefore, the fluid is converged into the outlet duct 14 by the convergence device 13. Advantageous embodiments of a convergence device 13 are explained with reference to FIG. 7 and FIG. 8.

Figure 2:
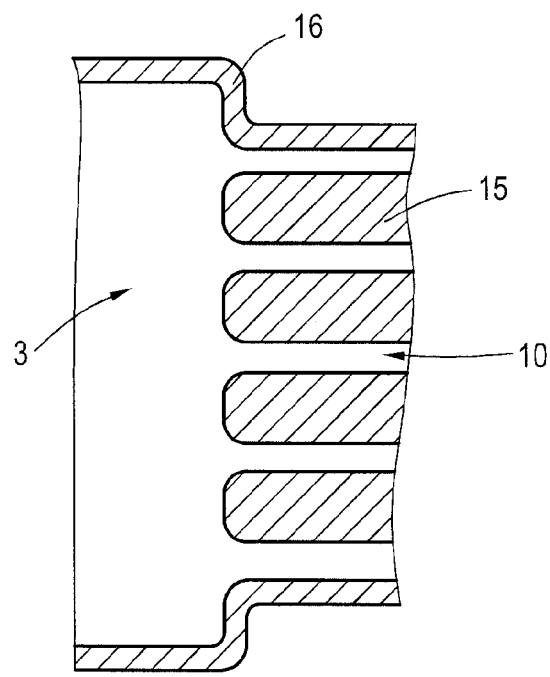
FIG. 2 shows an exemplary embodiment of a dividing device of a flowmeter according to the invention.

FIG. 2 shows an exemplary embodiment of a dividing stage. The fluid flows through the inlet duct 3 to the damming elements 15 and is apportioned to the ducts 10 by the damming elements 15. Uniform apportionment of the fluid to more than two subducts is possible only under specific conditions. In this case, the inflow duct 3 should be designed as a gap duct. This means that its height perpendicular to the image plane is smaller by a multiple than its width in the image plane. In FIG. 2, it is advantageous if the height of the inflow duct is equal to the height of the subducts 10, since in this case an especially simple set-up of the dividing device is possible.

In order to allow uniform distribution to five subducts, the height-to-width ratio should be at most 1:5, preferably at most 1:10. In a duct having round or virtually square dimensions, the flow profile in the duct can be approximated as a parabola in the case of a laminar flow. With increasing flattening of the duct, interaction with the side walls 16 in increasingly larger parts of the duct may be ignored. This means that the flow profile in the inflow duct 3 is homogeneous over a large part of the width and a parabolic shape occurs only in region near the wall 16. This means at the same time that, in the inlet region of the subducts 10, the flow velocity of the inflowing fluid is identical for all the subducts. A uniform apportionment of the fluid to the subducts 10 is therefore possible. A relatively large spacing shown for the subducts 10 by means of the structural elements 15 is advantageous since, as a result of this spacing, the mutual influencing of the fluid flows flowing into the subducts 10 is reduced or prevented. If interaction between the flows in the subducts 10 in the inflow region is not prevented, it is possible that semi-stable pressure distributions occur which raise or lower the flow resistance of individual subducts 10. This would lead, in turn, to a non-uniform distribution of the fluid flow. By means of the damming elements 15, the width of which is three times as large as that of the ducts 10, this effect is lessened.

Figure 3:
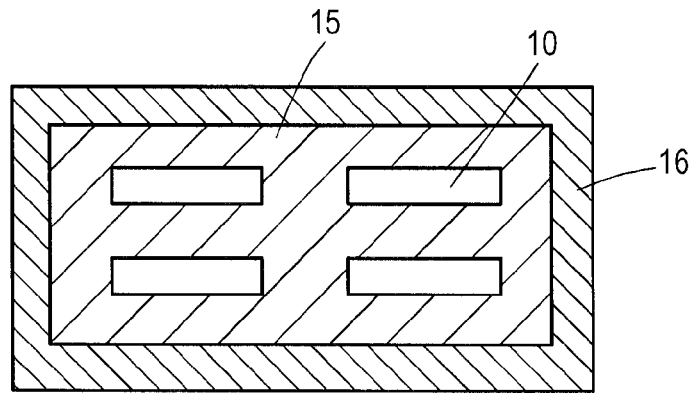
FIG. 3 shows a further exemplary embodiment of a dividing device of a flowmeter according to the invention.

FIG. 3 shows a further exemplary embodiment of the dividing device of a flowmeter. Here, a section through the damming element perpendicularly to the direction of the inflow duct is shown. A damming element 15 has four contiguous recesses 10 which form the subducts. It can easily be seen that each of these four subducts has an identical inflow geometry since the distances from the wall 16 and the further subducts 10 are identical for each of the subducts 10.

Figure 4:
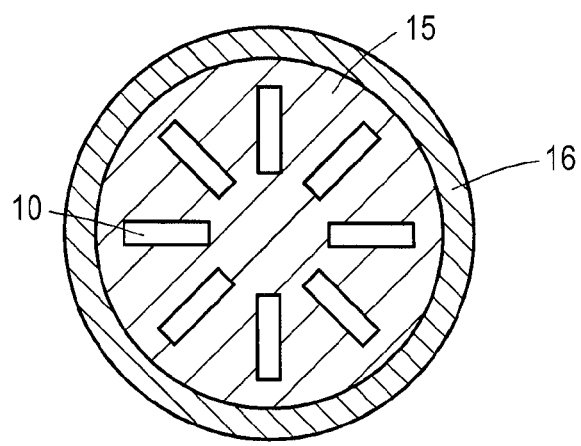
FIG. 4 shows a third exemplary embodiment of a dividing device of a flowmeter according to the invention.

FIG. 4 shows a further damming element 15 which can be introduced into a round duct with a duct wall 16 in order to form numerous subducts 10. The further set-up corresponds to the damming element 15 which is described with reference to FIG. 3. It should be noted that virtually any number of ducts 10 can be introduced into the damming element 15 shown in FIG. 4, since only a uniform angular spacing between the subducts has to be ensured here. In the dividing device shown, the longer side of the subducts 10 is oriented in the radial direction. Orientation in the circumferential direction is, of course, also possible. In addition, the subducts may also have any other shapes as long as the shape of all the subducts is identical.

It is also possible that the duct wall 16 and the damming element 15 have a uniform polygonal basic shape. In this case, too, subducts 10 spaced apart at an angle can be introduced into the damming element 15, the angular spacing selected having to be such that the symmetry of the polygon formed by the duct wall 16 is reproduced by the arrangement of the subducts 10.

Figure 5:
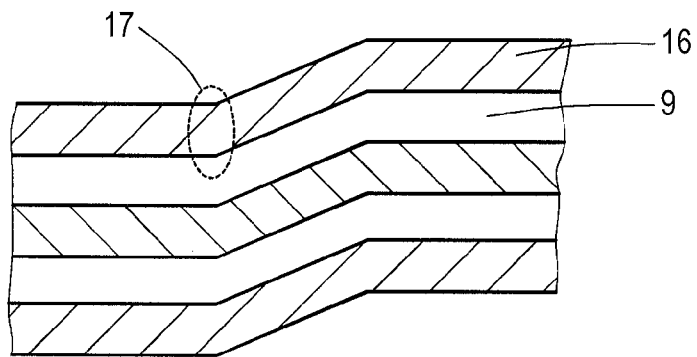
FIG. 5 shows an exemplary embodiment of an accelerating device of a flowmeter according to the invention.
Figure 6:
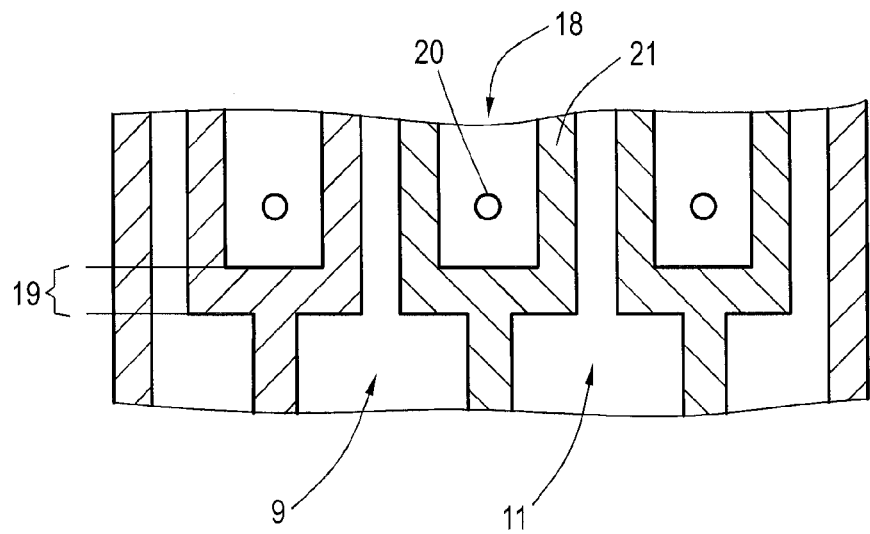
FIG. 6 shows a further exemplary embodiment of an accelerating device of a flowmeter according to the invention.

FIG. 5 and FIG. 6 show various exemplary embodiments of an accelerating device for a flowmeter. FIG. 5 shows ducts 9 which are spaced apart by walls 16. The walls 16 are arranged parallel perpendicularly to the original duct direction of the duct 9 and are shaped identically. Since the direction of all the walls changes by an angle α in the angled region 17, downstream of the angled region 17 the ducts 9 have a width which corresponds to the original width of the ducts 9, multiplied by the cosine of α.

Alternatively or additionally, acceleration of the fluid flow, that is to say also reduction in the duct area, may take place in that interspaces are generated between the ducts in one direction. This is achieved in that the walls 21 between the ducts 9, 11 have a Y-shape in the accelerating device. In the section upstream of the accelerating device 19, the wall 21 is designed as an individual wall which is arranged between the ducts 9 and 11. In the region of the accelerating device, this wall 21 is divided into two wall sections between which an interspace 18 is formed. The interspace 18 may be closed off completely with respect to the ducts, but it is also possible that the two ends of the wall 21 terminate freely in a duct, thereby forming an interspace 18 which is open downstream of the accelerating device, preferably downstream of the measurement region, in the direction of flow. In this case, liquid exchange of the interspace with the ducts 9, 11 takes place downstream of throughflow measurement. In order to prevent a standing fluid volume from being formed in the interspace 18, with the result that measurements may be falsified when the measurement gas is changed, purified fluid is introduced in the flowmeter via the orifice 20.

Figure 7:
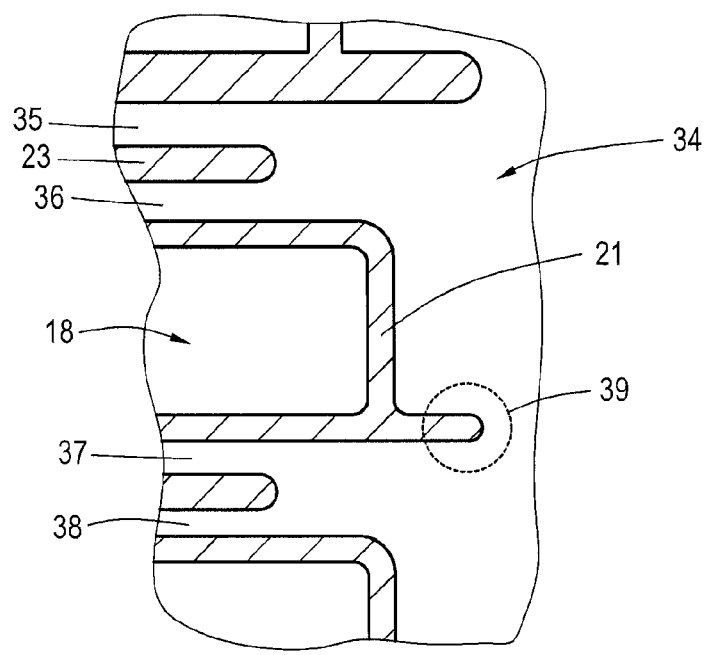
FIG. 7 shows an exemplary embodiment of a convergence device of a flowmeter according to the invention.
Figure 8:
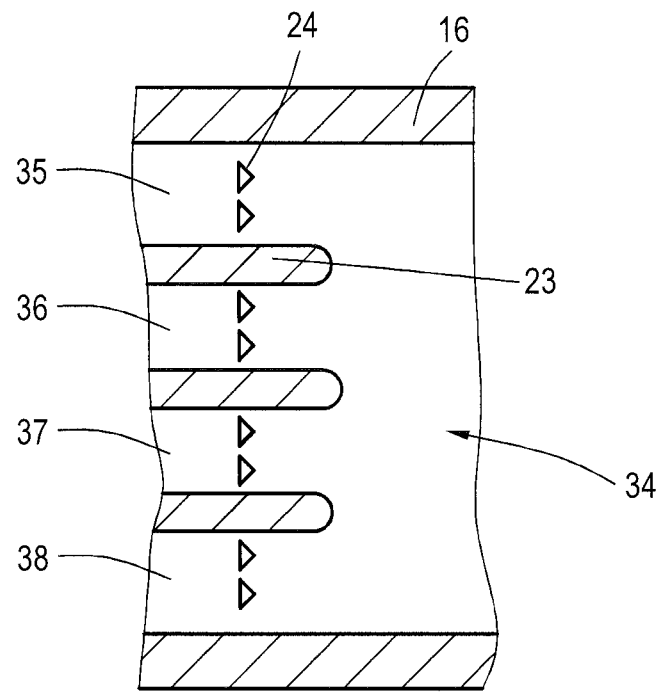
FIG. 8 shows a further exemplary embodiment of a convergence device of a flowmeter according to the invention.

FIG. 7 and FIG. 8 show various embodiments of the convergence device of a flowmeter.

FIG. 7 shows the convergence of the individual ducts 35, 36, 37 and 38 in the collecting duct 34. The ducts 35 and 36 and also 37 and 38 are spaced apart by a wall 23. These pairs of ducts are converged even before the end of the wall 21. Between the two pairs of ducts, an interspace 18 is arranged which is delimited by the wall 21. The wall 21 is shaped asymmetrically as a result of the lengthening element 39, so that the flow formed from the flows of the subducts 35 and 36 and the flow formed from the flows of the subducts 37 and 38 are routed in each case in the same direction. Random wall adhesion effects are thereby prevented.

FIG. 8 shows an exemplary embodiment which utilizes swirling elements 24 in order to prevent wall adhesions or semi-stable pressure distributions. The convergence of a plurality of ducts may give rise to problematic interactions between the flows of these ducts, and these interactions lead to a semi-stable pressure distribution in which highly differing pressures prevail in different regions of the convergence stage. The result of this may be that individual ducts 35, 36, 37, 38 have higher or lower flow resistances. In order to prevent this, for example, the fluid flowing out of the individual ducts 35, 36, 37 and 38 can be swirled. The vortex flows generated disrupt any semi-stable pressure distribution which is building up, with the result that a uniform pressure distribution is achieved. The fluid therefore flows, for example, in laminar form through the ducts 35, 36, 37, 38 to the swirling elements 24 and is swirled there and routed as a vortex flow into the collecting duct 34.

The swirling elements have an essentially flat surface in the flow direction. The flow consequently impinges upon the swirling elements 24 essentially perpendicularly, thus giving rise to a shear movement of the fluid which leads to turbulence. The swirling elements 24 are designed in cross section as triangles.

Figure 9:
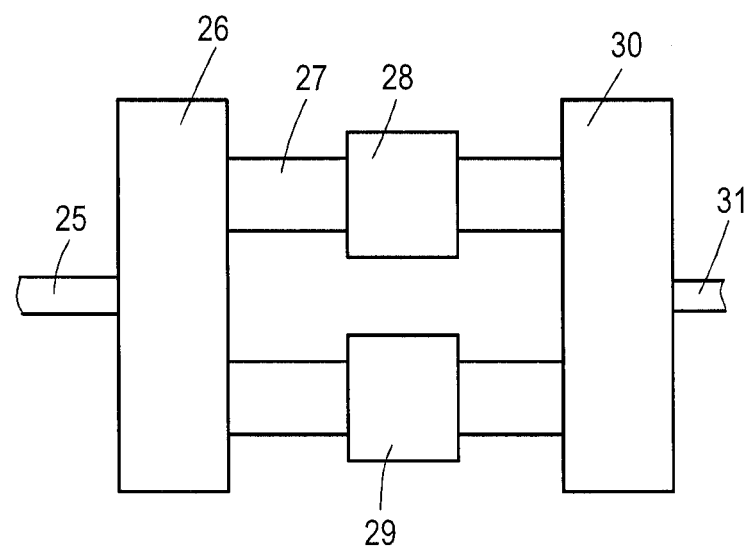
FIG. 9 shows a diagrammatic illustration of an exemplary embodiment of a flowmeter arrangement according to the invention.

FIG. 9 shows an exemplary embodiment of a flowmeter arrangement which comprises a flowmeter 28 and a flowmeter dummy 29. Fluid flowing in via the duct 25 is distributed uniformly to the ducts 27 in a dividing device 26, one of the ducts 27 being led to the flowmeter 28 and the other of the ducts 27 to the flowmeter dummy 29. Since the flowmeter 28 and the flowmeter dummy 29 are constructed identically, apart from the measuring device, the flowmeter 28 and flowmeter dummy 29 also have the same flow resistances. What is therefore achieved is that the flow resistance is overall identical for both ducts 27 and there is thus a uniform distribution of the fluid to the flowmeter 28 and the flowmeter dummy 29.

Uniform distribution of the fluid between the flowmeter 28 and the flowmeter dummy 29 is possible, in particular, by means of the above-described embodiments of dividing devices and a convergence device.

What is claimed is:

1. A flowmeter for a fluid, comprising a duct unit which forms the ducts of the flowmeter, the duct unit having a plurality of ducts in a measurement region, and at least one measuring device being arranged in one of these ducts, the duct unit comprising a dividing device with one or more dividing stages for apportioning the fluid flowing into the flowmeter to the ducts, the or each dividing stage comprising at least one damming element which apportions fluid flowing through an inflow duct to at least two subducts, wherein the dividing device and/or an accelerating device, which is arranged in at least one of the ducts between the dividing device and measurement region, are/is designed to accelerate the fluid in such a way that the fluid has a first flow velocity upstream of the dividing device and in the measurement region a second flow velocity which is at least 1.5 times as high.

2. The flowmeter according to claim 1, wherein said second flow velocity is at least twice as high as said first flow velocity.

3. The flowmeter according to claim 1, wherein the subducts of each dividing stage have essentially identical flow resistances and identical cross-sectional geometries.

4. The flowmeter according to claim 1, wherein in the dividing stage or in at least one of the dividing stages, at least two of the subducts are spaced apart by the damming element, the spacing of the subducts being at least three times as large as the diameter of one of the subducts.

5. The flowmeter according to claim 1, wherein in the dividing stage or in at least one of the dividing stages, the inflow duct is essentially rectangular and its width is at least three times as large as its height, the damming element subdividing the inflow duct in the width direction into at least two subducts, the subducts being spaced apart from the margin of the inflow duct in the width direction by at least 10% of the width of the inflow duct.

6. The flowmeter according to claim 5, wherein said damming element subdivides the inflow duct in the width direction into at least three subducts, the subducts being spaced apart from the margin of the inflow duct in the width direction by at least 15% of the width of the inflow duct.

7. The flowmeter according to claim 1, wherein in the dividing stage or in at least one of the dividing stages, the damming element subdivides the inflow duct into at least three subducts, the subducts lying in at least two planes.

8. The flowmeter according to claim 7, wherein the dividing stage consists, in a sectional plane in the region of the damming element perpendicular to the direction of the inflow duct, of at least three identical regions which each have at least one sub duct.

9. The flowmeter according to claim 8, wherein the cross section of the inflow duct is circular, and the dividing stage comprises at least three subducts spaced apart uniformly in the circumferential direction of the inflow duct.

10. The flowmeter according to claim 8, wherein the cross section of the inflow duct is rectangular, and the dividing stage comprises exactly four subducts.

11. The flowmeter according to claim 1, wherein in the dividing stage or in at least one of the dividing stages, the sum of the cross-sectional areas of the subducts is smaller than the cross-sectional area of the inflow duct.

12. The flowmeter according to claim 1, wherein the cross-sectional area of at least one the ducts is smaller downstream of the accelerating device than upstream of the accelerating device, the duct having in the region of the accelerating device an essentially rectangular shape with two side walls, with a bottom and with a top.

13. The flowmeter according to claim 12, wherein the accelerating device is an angled region, in which the direction of the duct changes into the direction of one or two of the side walls having the same shape in the angled region.

14. The flowmeter according to claim 12, wherein at least one of the side walls also forms a side wall of a second duct upstream of the accelerating device, and downstream of the accelerating device the duct and the second duct are spaced apart in the direction of the side wall by an interspace.

15. The flowmeter according to claim 14, wherein the bottom and/or the top are/is also continued in the region of the interspace and have in the region of the interspace an orifice for the introduction of purified fluid.

16. The flowmeter according to claim 1, wherein the duct unit comprises a convergence device with one or more convergence stages for converging the fluid flowing through the ducts of the measurement region into one outlet duct, each convergence stage converging into one collecting duct fluid flowing through at least two individual ducts.

17. The flowmeter according to claim 16, wherein in the convergence stage or in one of the convergence stages, the individual ducts end in a collecting duct with a larger diameter, at least one of the individual ducts having at its end a lengthening element which forms a lengthening of a side wall of the individual duct in part of the circumference of the individual duct.

18. The flowmeter according to claim 16, wherein the convergence device has at least one swirling element for swirling the fluid flow.

19. The flowmeter according to claim 18, wherein the swirling element is essentially flat on the side facing the fluid flow.

20. The flowmeter according to claim 18, wherein the individual ducts of the convergence stage or of at least one of the convergence stages have at least one or two swirling elements in the transitional region to the collecting duct.

21. The flowmeter according to claim 1, wherein the duct unit comprises at least one fluid reservoir which is arranged upstream of the dividing device and/or downstream of at least one of the convergence stages.

22. The flowmeter according to claim 1, wherein the length of at least one of the ducts is at least three times as large as the cross section of the duct.

23. The flowmeter according to claim 1, wherein the length of at least one of the ducts is at least five times as large as the cross-section of the duct.

24. The flowmeter according to claim 1, wherein the cross-sectional area of at least one of the ducts is rectangular or round.

25. The flowmeter according to claim 24, wherein the height:width ratio of at least one of the rectangular ducts is at most 1:3.

26. The flowmeter according to claim 25, wherein the height:width ratio of at least one of the rectangular ducts is at most 1:5.

27. The flowmeter according to claim 25, wherein the height:width ratio of at least one of the rectangular ducts is at most 1:10.

28. The flowmeter according to claim 24, wherein at least one of the ducts is between 0.7 mm and 1.5 mm high.

29. The flowmeter according to claim 1, wherein additional damming elements for increasing the flow resistance are arranged in at least one of the ducts.

30. The flowmeter according to claim 1, wherein the at least one measuring device consists in the measurement region of a sensor or sensor arrangement which detects a fluid variable.

31. The flowmeter according to claim 30, wherein said fluid variable is throughflow rate.

32. The flowmeter according to claim 30, wherein the sensor arrangement comprises a thermal or microthermal sensor or the sensor is a thermal or microthermal sensor.

33. The flowmeter according to claim 30, wherein the sensor arrangement comprises an ultrasonic sensor.

34. The flowmeter according to claim 33, wherein said ultrasonic sensor is an ultrasonic sensor unit operating according to the differential transit-time method.

35. A flowmeter arrangement comprising at least one flowmeter according to claim 1 and at least one flowmeter dummy which is constructed identically to the flowmeter, except that there is no measuring device arranged in the measuring duct, an additional dividing device being designed for the uniform distribution of a fluid stream to the flowmeter and to the flowmeter dummy, and an additional convergence device being designed for converging the fluid streams of the flowmeter and of the flowmeter dummy.

* * * * *

UNITED STATES PATENT AND TRADEMARK OFFICE
CERTIFICATE OF CORRECTION

| | | |
|---|---|---|
| PATENT NO. | : 9,222,811 B2 | Page 1 of 1 |
| APPLICATION NO. | : 14/291246 | |
| DATED | : December 29, 2015 | |
| INVENTOR(S) | : Sonnenberg | |

It is certified that error appears in the above-identified patent and that said Letters Patent is hereby corrected as shown below:

Title page, It Should Read:

(73) Assignee: HYDROMETER GMBH, Ansbach (DE)

Signed and Sealed this
Twenty-sixth Day of July, 2016

Michelle K. Lee
*Director of the United States Patent and Trademark Office*